United States Patent [19]

Matsunaga et al.

[11] Patent Number: 4,684,210

[45] Date of Patent: Aug. 4, 1987

[54] LIGHT TRANSMISSION DEVICE

[75] Inventors: Hiroshi Matsunaga; Yoji Shimojima; Ichiro Tokunaga, all of Furukawa; Kosei Obata, Miyagi, all of Japan

[73] Assignee: Alps Electric Co., Ltd., Japan

[21] Appl. No.: 698,562

[22] Filed: Feb. 6, 1985

[30] Foreign Application Priority Data

Jun. 22, 1983 [JP] Japan ................................ 58-94919

[51] Int. Cl.⁴ .................................................. G02B 7/26
[52] U.S. Cl. ................................ 350/96.20; 350/96.21
[58] Field of Search ................... 350/96.2, 96.21, 96.15

[56] References Cited

U.S. PATENT DOCUMENTS

| 4,118,105 | 10/1978 | Voight | 350/96.2 |
| 4,461,539 | 7/1984 | Bailey et al. | 350/96.21 |
| 4,477,146 | 10/1984 | Bowen et al. | 350/96.21 |

Primary Examiner—Eugene R. LaRoche
Assistant Examiner—Steven J. Mottola
Attorney, Agent, or Firm—Guy W. Shoup

[57] ABSTRACT

Discloded is a light transmission device in which a plug is elastically urged toward an E-O converter element by a plug urging means provided between the plug and a receptacle of a light transfer device and in which a spacer is provided between the plug and the E-O converter element so that the end surface of the plug and the E-O converter element are separated from each other by a predetermined distance.

3 Claims, 5 Drawing Figures

LIGHT TRANSMISSION DEVICE

BACKGROUND OF THE INVENTION

Field of the Invention

The present invention relates to a light transmission device and more particularly to a light transmission device in which a plug provided at an end of an optical fiber is connected to a light transfer device including an electrical-optical ( E-O ) converter element, such as a light emission element, a light reception element, or the like, so as to transfer light between the optical fiber and the E-O converter element.

As such a light transmission device of this type, there has been proposed a device in which a receptacle of a light transfer device is formed by molding a synthtic resin material, the receptacle being integrally provided with an outward projecting plug-insertion cylindrical portion, the plug insertion cylindrical portion being formed with a plurality of slots each opened at the end surface of the plug portion to thereby divide the plug portion into a plurality of flexible engagement portions, each of the flexible engagement portions being provided with an engagement protrusion projecting from the inner surface of the tip end thereof, the receptacle being formed with a plug insertion hole opened at the plug insertion cylindrical portion, an E-O converter element such as a light emission element, a light reception element, or the like, is faced to the plug insertion hole, a clindrical plug being fitted to an optical piber at its end outer periphery, a flange projecting from the outer periphery of the plug and serving as an engament protrusion, the plug being inserted into the plug insertion hole from the plug insertion cylindrical portion.

In the thus arranged light transmision device, if the plug is inserted into the plug insertion hole through the plug insertion cylindrical portion, the flexible engagement portions are outward bent, get over the flange, and engaged by the flange. At this time, the respective end surfaces of the plug and the optical fiber are made into contact with the E-O converter element. Thus, through this connection, light transfer is achieved between the optical fiber and the E-O converter element.

Since an optical fiber core of the optical fiber was formed by a soft material such as acryl resin, however, the end surface of the optical fiber could be injured when it was brought into contact with the end surface of the E-O converter element and in that case the light transer could be be adversely affected.

Further, in a mold receptacle, the plug insertion hole could not be formed with precision of 1/100 mm order, while it could be formed with precision of 1/10 mm order. Furthermore, the length of the flexible engagement portions also could not be formed with high·precision. For this, when the plug was inserted into the plug insertin hole, a gap might be formed between the end surface of the optival fiber and the end surface of the E-O converter element, the gap being not constant, resulting in risk of adverse effect on light transfer.

SUMMARY OF THE INVENTION

An object of the present invention is therefore to eliminate the above-mentioned disadvantages in the prior art.

Another object of the present invention is to provide a light transmission apparatus in which when a plug is inserted into a plug insertion hole, a predetermined gap is formed between the respective end surfaces of an optical fiber and an E-O converter element to thereby prevent the end surface of the optical fiber from occurring and preventing an uncertain gap from being formed between the end surface of the optical fiber and the E-O converter element.

To achieve the above-mentioned objects, according to the present invention, the light transmission device is featured in that a plug is elastically urged toward an E-O converter element by a plug urging means provided between the plug and a receptacle of a light transfer device and in that a spacer is provided between the plug and the E-O converter element so that the end surface of the plug and the E-O converter element are separated from each other by a predetermined distance.

Other objects and features of the present invention will be apparent from the following description taken in connection with the accompanying drawings.

DESCRIPTION OF PREFERRED EMBODIMENT

Figure 1:
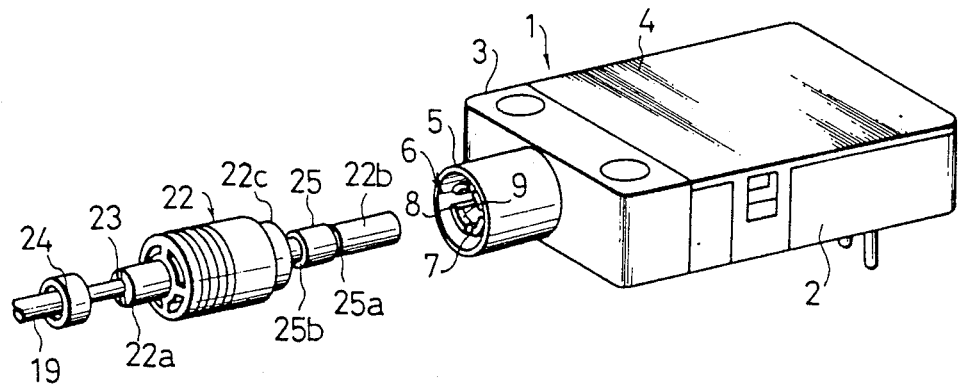
FIG. 1 is an exploded perspective view of the light transmission device according to the present invention.

Referring to the drawings, an embodiment of the present invention will be described hereunder.

Figure 2:
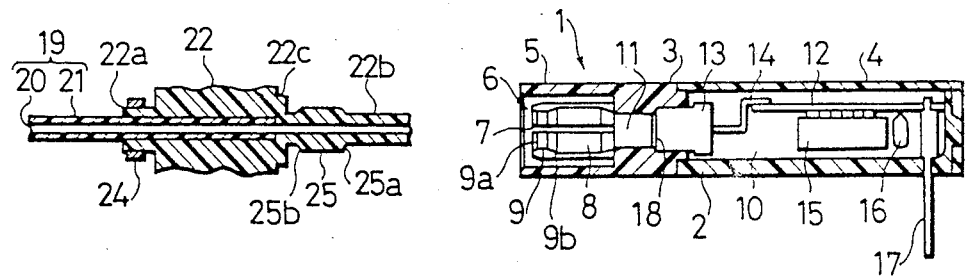
FIG. 2 is a cross-section of the light transmission device of FIG. 1.
Figure 3:
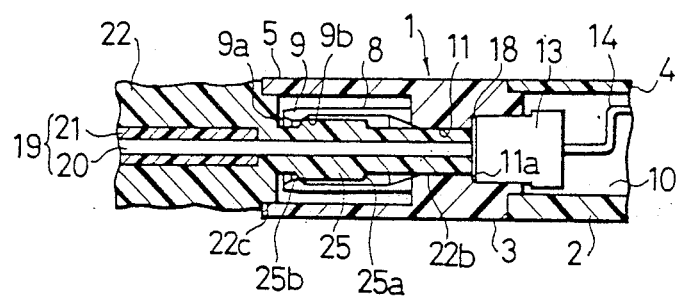
FIG. 3 is a main part cross-section showing the state where the plug shown in FIG. 3 has been connected to the light transfer device.

In FIGS. 1 to 3, reference numeral 1 designates a light transfer device which is provided with a casing 2 opened at its top and one side, a receptacle 3 fixedly attached onto one side of the casing 2, and a cover 4 for closing the top of the casing 2.

Figure 4:
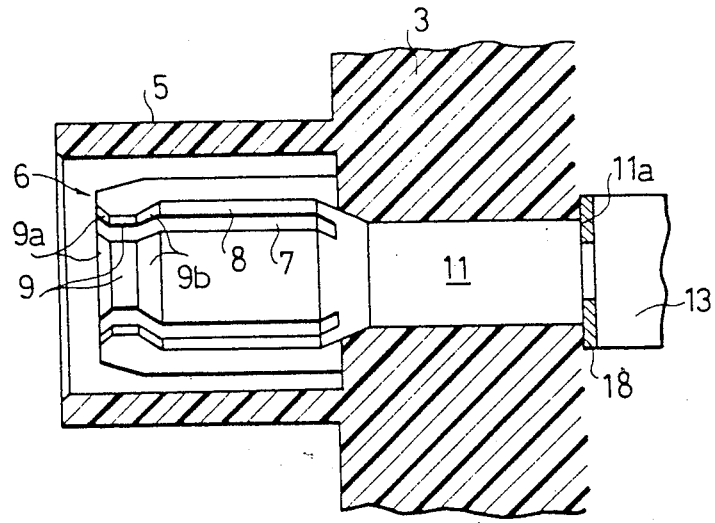
FIG. 4 is a main part cross-section of the light transfer device shown in FIG. 1.

At the outer peripheral surface of the receptacle 3, integrally formed are an outer cylinder 5 for preventing dust from coming in and a plug insertion cylinder 6 provided in the outer cylinder 5 coaxially therewith ( see FIG. 4 ). In the plug insertion cylinder 6, four slots 7 are circumferentially formed at angular intervals of 90 degrees, the slots 7 being opened at the end surface of the plug insertion cylinder 6. The slots 7 divides the plug insertion cylinder 6 into four flexible engagement portions 8. At the tip end of each of the flexible engagement portions 8, an inward projecting engagement protrusion 9 is integrally formed. A ramp guide surface 9a and a ramp engagement surface 9b are respectively formed at the inner and outer sides of the engagement protrusion 9.

A plug insertion hole 11 is formed in the receptacle 3, the hole 11 being communicating with the plug insertion cylinder 6 and an electronic parts containing chamber 10 in the casing 2. A printed circuit substrate 12 is mounted in this electronic parts containing chamber 10. An end of an E-O converter element 13 is fitted into the plug insertion hole 11 and the other end of the same is disposed in the chamber 10. As the E-O converting element 13, a light emission element, or a light reception element, or an combination of a light emission element and a light reception element can be used. The E-O converter element 13 and the printed circuit substrate 12 are wired through a conductor wire 14. In the drawing, reference numerals 15 and 16 designate signal processing electronic parts mounted on the substrate 12 and reference numeral 17 designates a terminal attached on the printed circuit substrate 12 and extending outward through the casing 2.

A ring-like spacer 18 is disposed between the E-O converting element 13 and a stepped portion 11a formed in the plug insertion hole 11. This spacer 18 is made out of a metal material with a thickness of 1/100 mm order. However, the material of the spacer 18 is not always restricted to metal.

Reference numeral 19 designates an optical fiber which is constituted by an optical fiber core 20 made of an acryl resin material and a bark 21 of a resin material covering the optical fiber core 20. A cylindrical plug 22 is fitted to one end of the optical fiber 19 and fixed thereto by caulking a base portion 22a thereof by a caulking ring 24. The optical fiber core 20 of the optical fiber 19 extends to the tip end surface of the plug 22. The plug 22 is provided at its tip end with a small diameter axis portion 22b, at its midway portion with an outer cylinder fitting portion 22c, and at the outer periphery of the small diameter axis portion 22b, with a flange 25 which outward projects and serves as an engagement protrusion. The flange 25 is formed with a ramp guide surface 25a located at the tip end side of the plug 22 and a ramp engagement surface 25b located at the opposite side to the ramp guide surface 25a. Further, the outer diameter of the flange 25 is selected to be somewhat larger than the inner diameter of the tip end portion of the plug insertion cylinder 6, that is the inner diameter at the portion where the engagement protrusion 9 is formed.

Figure 5:
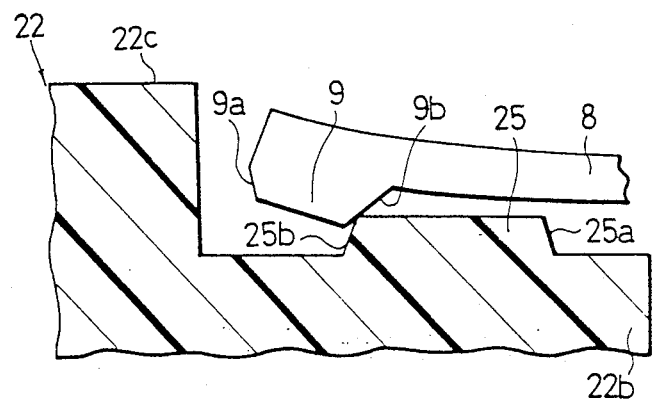
FIG. 5 is an enlarged cross-section of a part of FIG. 3.

This plug 22 is inserted into the plug insertion hole 11 through the plug insertion cylinder 6 and the tip end of the plug 22 is brought into contact with the spacer 18 as shown in FIG. 3. The ramp engagement surface 9b of the engagement protrusion 9 is elastically urged against a corner portion of the ramp engagement surface 25b by the spring force of the flexible engagement portions 8, thereby causing the plug 22 to softly contact with the spacer 18 ( see FIGS. 3 and 5 ). Thus, the flexible engagement portions 8 and the ramp engagement surfaces 9b and 25b constitute a plug urging means. The outer cylinder fitting portion 22c is fitted into the outer cylinder 5 so as to prevent dust from coming into the junction portion.

The function of the thus arranged light transmission device will be described hereunder.

To connect the plug 22 to the light transfer device 1, it is sufficient to merely insert the plug 22 into the plug insertion hole 11 through the plug insertion cylinder 11. At this time, after the ramp guide surface 9a has been brought into contact with the ramp guide surface 25a, it is slided on the ramp guide surface 25a to the peripheral surface of the flange 25 so that the flexible engagement portions 8 are radially bent against their own elasticity to widen the opening of the plug insertion cylinder 6 at the respective tip ends of the flexibe engagement portions 8. Then, after the ramp guide surface 9a has been slided on the peripheral surface of the flange 25 to the ramp engagement surface 25b, it is brought into elastic contact with the ramp engagement surface 25b. Thus, the plug 22 is engaged with the plug insertion cylinder 6. At the same time, the acting direction of a part of the spring force of each of the flexible engagement portions 8 directed to the radial center of the plug insertion cylinder 6 is changed to direct toward the E-O converter element 13 by the action of the ramp engagement surfaces 9b and 25b. Thus, the tip end of the plug 22 is brought into elastic contact with the spacer 18. Under this condition, the optical fiber core 20 is separated from the E-O converter element 13 by a predetermined distance, that is by the thickness of the spacer 18. Namely, a predetermined gap is formed between the optical fiber core 20 of the optical fiber 19 and the E-O converter element 13.

Thus, in the state where the plug 22 has been brought into contact with the light transfer device 1, light transfer can be achieved between the optical fiber core 20 of the optical fiber 19 and the E-O converter element 13. That is, in the case where a light emission element is used as the E-O converter element 13, the E-O converter element 13 converts an electric signal into an optical signal which is then inputted to the optical fiber core 20. On the contrary, when a light reception element is used as the E-O converter element 13, an optical signal guided through the optical fiber 19 is inputted to the E-O converter element 13 which converts the optical signal into an electric signal. Further, in the case where a pair of parallelly provided light emission element and a light reception element are used as the E-O converter element, the above-mentioned two operations may be performed at the same time. The plug 22 can be removed from the light tranfer device 1 merely by pulling the plug 22 from the device 1.

As described above, in the light transmision device according to the present invention, a plug is elastically urged toward an E-O converter element by a plug urging means provided between the plug and a light transfer device and a spacer is provided between the plug and the E-O converter element so that the end surface of the plug and the E-O converter element are separated from each other by a predetermined distance, whereby when the plug is inserted into a plug insertion hole, the end surface of the optical fiber is not brought into direct contact with the E-O converter element so that the end surface of the optical fiber is prevented from being injured by the E-O converter element. Further, even if there are variations in dimension among plug insertion holes respectively formed in receptacles, the distance between the end surface of the optical fiber and the E-O converter element can be always set to a constant value so that light transfer can be achieved in a good manner as a set in advance.

We claim:

1. In a light transmission device in which a cylindrical plug fitted to the outer periphery of an optical fiber at its end portion is inserted into a plug insertion hole formed in a receptacle of a light transfer device having an optical converter element therein, the improvement comprising:

said plug having a front end surface to be spaced a predetermined distance from an end surface of said optical converter element when said plug is inserted in said receptacle;

a spacer having a thickness corresponding to said predetermined distance interposed in contact between said end surfaces of said plug and said optical converter element;

said plug having on an outer periphery thereof spaced from its front end surface a flange having a rearwardly facing ramp engagement surface tapered at an angle to a centerline axis of said plug;

said receptacle having in its insertion hole a flexible engagement portion extending in the axial direction toward the opening of said insertion hole and radially spaced from the centerline axis so as to allow said plug to be inserted therein, said flexible engagement portion having at an end toward said insertion hole an engagement protrusion having a frontwardly facing ramp engagement surface tapered at an angle to the centerline axis, wherein said flexible engagement portion elastically urges and holds said plug against said spacer in contact with said end surface of said converter element, so that said predetermined distance between the two end surfaces is securely maintained, by said frontwardly facing ramp engagement surface of said engagement protrusion elastically and slidably bearing against said rearwardly facing ramp engagement surface of said flange on said plug.

2. A light transmission device according to claim 1, in which said spacer is formed into a ring-like shape.

3. A light transmission device according to claim 1, in which said engagement protrusion is integrally formed at a tip end of each of a plurality of flexible engagement portions formed in said receptacle, a ramp guide surface and a ramp engagement surface being respectively formed at an inner and an outer side portion of said engagement protrusion.

* * * * *